(12) United States Patent
Tiao et al.

(10) Patent No.: US 8,504,402 B1
(45) Date of Patent: Aug. 6, 2013

(54) SCHEDULE OPTIMIZATION USING MARKET MODELING

(75) Inventors: Chieh Hsien Tiao, Irving, TX (US); David John Michael, Dallas, TX (US)

(73) Assignee: Southwest Airlines Co., Dallas, TX (US)

( * ) Notice: Subject to any disclaimer, the term of this patent is extended or adjusted under 35 U.S.C. 154(b) by 600 days.

(21) Appl. No.: 12/492,978

(22) Filed: Jun. 26, 2009

(51) Int. Cl.
*G06Q 10/00* (2012.01)

(52) U.S. Cl.
USPC .................. 705/7.12; 705/7.13; 705/7.29

(58) Field of Classification Search
USPC ....................... 705/7.12, 7.13, 7.29
See application file for complete search history.

(56) References Cited

U.S. PATENT DOCUMENTS

| | | | |
|---|---|---|---|
| 6,314,361 B1 * | 11/2001 | Yu et al. .................. | 701/120 |
| 7,006,903 B2 * | 2/2006 | Smith et al. ............. | 701/3 |
| 7,228,207 B2 * | 6/2007 | Clarke et al. ........... | 701/3 |
| 7,340,405 B1 * | 3/2008 | Gunther et al. ......... | 705/6 |
| 7,363,319 B2 * | 4/2008 | Cappellini ............... | 1/1 |
| 7,702,427 B1 * | 4/2010 | Sridhar et al. .......... | 701/4 |
| 7,707,056 B1 * | 4/2010 | Anbil et al. ............. | 705/7.12 |
| 7,725,337 B2 * | 5/2010 | Chu et al. ............... | 705/5 |
| 7,734,493 B1 * | 6/2010 | Anbil ...................... | 705/7.22 |
| 8,014,908 B2 * | 9/2011 | Clarke et al. ........... | 701/3 |
| 2003/0004764 A1 * | 1/2003 | Niedringhaus .......... | 705/7 |
| 2004/0128193 A1 * | 7/2004 | Brice et al. ............. | 705/14 |
| 2008/0059273 A1 * | 3/2008 | Miller ..................... | 705/8 |
| 2008/0301159 A1 * | 12/2008 | Zhang et al. ............ | 707/100 |
| 2009/0254405 A1 * | 10/2009 | Hollis ..................... | 705/9 |
| 2010/0082394 A1 * | 4/2010 | Pachon et al. .......... | 705/8 |

OTHER PUBLICATIONS

Michael Ball, Cynthia Barnhart, George Nemhauser, Amedeo Odoni, "Chapter 1, Air Transportation: Irregular Operations and Control." in Cynthia Barnhart Gilbert Laporte, Eds, Handbooks in Operations Research and Management Science, vol. 14, 2007, DOI:10.1016/S10927-0507(06)14001-3.*

Cynthia Barnhart, Timothy S. Kniker, and Manoj Lohatepanont. "Itinerary-Based Airline Fleet Assignment." Transportation Science, vol. 36, No. 2, May 2002 pp. 199-217, eissn 1526-5447.*

Cynthia Barnhart, Peter Belobaba, Amedeo R. Odoni. "Applications of Operations Research in the Air Transport Industry." Transportation Science, vol. 37, No. 4, Nov. 2003, pp. 368-391, eissn 1526-5447).*

Cynthia Barnhart and Amy Cohn. ("Airline Schedule Planning: Accomplishments and Opportunities." Manufacturing & Service Operations Management, vol. 6, No. 1, Winter 2004, pp. 3-22, eissn 1526-5498).*

A. Erdmann, A. Nolte, A. Noltemeier, and R. Schrader Zaik. "Modeling and Solving an Airline Schedule Generation Problem." Annals of Operations Research 107, 117-142, 2001.*

Hai Jiang and Cynthia Barnhart. ("Dynamic Airline Scheduling." Aug. 17, 2006).*

(Continued)

*Primary Examiner* — Roman Jeanty
*Assistant Examiner* — George H Walker
(74) *Attorney, Agent, or Firm* — Fish & Richardson P.C.

(57) ABSTRACT

A schedule for a network of transportation resources is produced by iteratively generating sets of variables for each market pair using an objective function and based on at least an identified range of permissible departure or arrival times for each market pair and spacing parameters. Each variable represents a different set of possible departure or arrival times for a particular market pair. The proposed schedule is built based on the generated sets of variables for each market pair and a set of constraints.

22 Claims, 5 Drawing Sheets

| | DAL-HOU |
|---|---|
| $X_1$ | 7:00 AM<br>9:00 AM<br>12:00 PM<br>3:00 PM<br>6:00 PM |

| | DAL-HOU |
|---|---|
| $X_2$ | 7:05 AM<br>9:00 AM<br>12:00 PM<br>3:00 PM<br>6:00 PM |

| | DAL-HOU |
|---|---|
| $X_3$ | 7:10 AM<br>9:00 AM<br>12:00 PM<br>3:00 PM<br>6:00 PM |

(56) References Cited

OTHER PUBLICATIONS

B. Rexing, C. Barnhart, T. Kniker, A. Jarrah, N Krishnamurthy. "Airline Fleet Assignment with Time Windows." Transportation Science, vol. 34, No. 1, Feb. 2000, pp. 1-20, eissn 1526-5447.*

Russell A. Rushmeier, Karla L Hoffman and Manfred Padberg. ("Recent Advances in Exact Optimization of Airline Scheduling Problems." Jul. 1995).*

Hanif D. Sherali, Ebru K. Bish and Xiaomei Zhu. ("Airline fleet assignment concepts, models, and algorithms." European Journal of Operational Research 172 (2006) 1-30. doi:10.1016/j.ejor.2005.01.056).*

Nicolas Belanger, Guy Desaulniers, Francois Soumis, Jacques Desrosiers. "Periodic airline fleet assignment with time windows, spacing constraints, and time dependent revenues." European Journal of Operational Research 175 (2006) 1754-1766, doi:10.1016/j.ejor.2004.04.051.*

Bélanger et al "Periodic airline fleet assignment with time windows, spacing constraints, and time dependent revenues." European Journal of Operational Research 175 (2006).*

* cited by examiner

FIG. 6
- $X_1$ | DAL-HOU 7:00
- $X_2$ | DAL-HOU 7:05
- ⋮
- $X_n$ | DAL-HOU 12:00

FIG. 7

$X_1$ | DAL-HOU
7:00 AM
9:00 AM
12:00 PM
3:00 PM
6:00 PM $X_2$ | DAL-HOU
7:05 AM
9:00 AM
12:00 PM
3:00 PM
6:00 PM $X_3$ | DAL-HOU
7:10 AM
9:00 AM
12:00 PM
3:00 PM
6:00 PM

SCHEDULE OPTIMIZATION USING MARKET MODELING

TECHNICAL FIELD

This invention relates to schedule and route planning, and more particularly to developing a schedule that results in an improved allocation of transportation resources.

BACKGROUND

Commercial airlines typically have significant numbers of aircraft and serve dozens, if not more, of geographically diverse markets. Day-to-day operations require coordination of a variety of different business functions, including crew scheduling, maintenance, schedule planning, dispatch, equipment scheduling, purchasing, and the like. Because many of the different business functions are interdependent, changes to one aspect of the operations can have an effect on other parts of the overall business. The logistics behind coordinating operations is further complicated by the geographic distribution of markets.

Generally, most of the operations of a commercial airline are centered around flight schedules. As with the coordination of day-to-day operations, the design of the overall flight schedule for a commercial airline involves complex interactions of numerous factors. Schedule design must take into account consumer demand, the ability to make connecting flights, maintenance requirements, gate availability, flight times and distances, airport restrictions and curfews, the number of available aircraft, and the like. Because of these various factors and the need to coordinate other business functions with the overall flight schedule, changes to a schedule design are generally performed weeks or even months in advance of implementing a change. The need for such advance planning limits the flexibility of commercial airlines in adapting to an evolving business environment, increasing efficiency, or otherwise modifying the overall flight schedule.

One important factor in designing a flight schedule is the manner in which flights are spaced between and within markets to appropriately meet consumer demand. The distribution of flights in an appropriate manner is typically a complex task. For example, designing a flight schedule for a particular market involves the consideration of both demand for a particular departure time at the market as well as the distribution of demand among flights at and around that particular departure time. Numerous other factors can also impact the process of designing flight schedules, including limited availability of aircraft and other physical resources, maintenance requirements, legal and regulatory requirements, and personnel availability.

SUMMARY

Network transportation scheduling can be solved using mathematical programming, which involves setting up market timings as variables, constrained by all type of operations resources, and utilizing advanced techniques such as column generations to reduce the problem into solvable size. Evaluating possible schedule options to generate viable solutions is a complicated problem. Demand data at each departure time can be used to evaluate the schedule, but the interaction between departure times, such as cannibalizing effect, spill, recapture, and the like generally make such a methodology unusable for evaluating schedules built from scratch (i.e., without a "seed" schedule of initially proposed departure times). However, the use of market windows and spacings to describe the markets in combination with an assessment of the value of their departure timings to develop schedule proposals from scratch allows such a complicated problem to be solved efficiently and reliably.

A schedule for a network of transportation resources is produced by iteratively generating sets of variables for each market pair using an objective function and based on at least an identified range of permissible departure or arrival times for each market pair and spacing parameters. Each variable represents a different set of possible departure or arrival times for a particular market pair for a marketing day (or other periodic time frame). The proposed schedule is built based on the generated sets of variables for each market pair and a set of constraints.

The details of one or more embodiments of the invention are set forth in the accompanying drawings and the description below. Other features of the invention will be apparent from the description and drawings, and from the claims.

DESCRIPTION OF DRAWINGS

Like reference symbols in the various drawings indicate like elements.

DETAILED DESCRIPTION

Scheduling a network of transportation resources can involve techniques for simultaneously generating a schedule design, allocating an equipment fleet, and assigning routes. A proposed schedule is automatically generated based on specified parameters and constraints using mathematical programming.

The techniques can be used to generate an airline flight schedule, to allocate equipment (e.g., individual aircraft or aircraft type), and to assign routes. In general, a flight schedule encompasses departure and arrival times (i.e., flight instances) and the corresponding departure and arrival stations for specific flights. Each particular airport is associated with or defines a particular market, and the two markets associated with a flight, with its origin at the first market and its destination at the second market, is a market pair. In some situations, a market may refer generally to a location, which may have more than one airport, or more specifically to a particular airport. In general, the level of granularity of a market can be selected according to the particular circumstances. Allocation of equipment involves assigning types of aircraft (and/or specific aircraft) to particular flights in the flight schedule. Assigning a route involves determining a sequence of flights to be handled by a single aircraft. In general, although described in the context of flights and aircraft, the techniques can be more generally applied to transportation segments and transportation resources.

The present disclosure generally describes the use of mathematical optimization to generate a schedule for transportation resources such that the schedule conforms to mathematically defined preferences and/or requirements. The preferences and requirements provide parameters for generating a schedule with features considered to be beneficial for increasing passenger traffic on scheduled flights or other goals. These parameters include predetermined boundaries of a marketing day, spacing parameters, and other factors. Specifically, boundaries of a marketing day and spacing parameters are identified for each market pair. Next, composite variables are iteratively generated based on the boundaries of the marketing day and the spacing parameters, where each composite variable represents a set of departure or arrival times for a market pair. The iterative generation of composite variables is performed using an objective function that evaluates the relative value of each variable among different variables. Generally, a sampling or subset of all possible variables is generated and considered for inclusion in the final overall schedule. Finally, an overall schedule is generated using the generated composite variables based at least in part on a plurality of operational constraints. Different composite variables for a particular market pair may be combined using a weighting function.

In some implementations, during each iteration of generating the composite variables, the variables can be evaluated based on the demand for the departure times in a particular variable. Evaluating the variables based only on demand, however, may not account for the peripheral effect that flights scheduled at each departure time may have on flights scheduled at adjacent and surrounding departure times. In other words, a flight scheduled at a particular departure time may interact with a flight scheduled at an adjacent departure time, wherein both flights cause cannibalization effects, spillover, recapture, or other effects on each other. Accordingly, in certain implementations, marketing day and spacing parameters are used to evaluate the composite variables in order to account for the secondary effects that each departure time has on adjacent departure times.

The generation of a flight schedule involves analyzing a multitude of factors. These factors can include parameters, or constraints, to which the flight schedule must or should conform. For example, one mandatory constraint of every market is that the number of aircraft departing the market must equal the number of aircraft arriving at the market; that is, for every departing flight, there must be a corresponding and previously arrived flight. The factors which affect the generation of a flight schedule also include more flexible parameters or measurements of efficiency such as meeting demand, generating revenue, and appropriately distributing flight times. Thus, a preferred flight schedule is one that more substantially meets the requirements of efficiency measurements and various predetermined constraints. Mathematical optimization techniques, including the use of linear and dynamic programming, can be used to determine an optimal schedule that best meets the set of predetermined preferences and requirements. The term "optimal," in the context of flight schedule generation, may refer to a particular schedule option that has the most beneficial features, including high efficiency measurements and satisfaction of predetermined constraints, when compared to all other schedule options. Optimal may also be used more loosely to describe a schedule option that contains more features considered to be beneficial than most other schedule options, is relatively efficient when compared to some or most other schedule options, or is generally preferred over other options that satisfy or substantially satisfy certain constraints. Similarly, "optimization" may refer to the process of selecting schedule options or generating a flight schedule that has the most beneficial features when compared to other options. Optimization may also refer to the process of generating one or more flights schedules that are generally preferred over some or most other options due to the presence of more beneficial features such as satisfying certain constraints. One optimization technique that may be utilized for solving large-scale optimization problems such as flight generation is linear programming.

A flight schedule for a group of markets is comprised of a listing of departure or arrival times for each market pair associated with each market. In some implementations, a flight schedule is first generated to account for non-stop services between markets before accounting for multiple stop services in a transportation network. Typically, it is not necessary to consider departure and arrival times as independent variables because they are interrelated by known or approximate travel times. For example, there may be two flights a day from Dallas to Houston—the first flight with a departure time of 8:00 a.m. and the second flight with a departure time of 4:00 p.m. These departure times for the Dallas market can be selected based on the degree to which particular parameters and efficiency measurements are satisfied when the two flights from Dallas to Houston are scheduled at 8:00 a.m. and 4:00 p.m. For example, the Dallas market may have a parameter requiring all departing flights to be scheduled between 8:00 a.m. and 7:00 p.m. due to airport operating hours. Furthermore, the historical data of the market may indicate that the peak demand for flights from Dallas to Houston are at 8:00 a.m. and 4:00 p.m. Thus, the departure times in the example, 8:00 a.m. and 4:00 p.m., substantially satisfy the requirements of the parameters and efficiency measurements and are slightly preferred over, for example, departure times of 9:00 a.m. and 3:00 p.m.

Markets are defined by stations (i.e., airports) associated with the market. For example, Dallas Love Field is associated with the Dallas market and may define the Dallas market from the perspective of an airline. A market pair is a pair of stations between which one or more flights are to be scheduled. Each market pair is directional in that it includes a departure station and an arrival station. Market pairs can be represented by codes for each station. For example, Dallas Love Field is represented by the station code "DAL" and Austin is represented by the station code "AUS". Accordingly, the Dallas-Austin market pair in the Dallas to Austin direction is represented, for example, by "DAL-AUS". Generally, the number of flights for each market pair in one direction (e.g., "DAL-AUS") has a corresponding number of flights for the market pair in the other direction (e.g., "AUS-DAL").

Generating a flight schedule can also involve determining hook-ups for each routing segment of the transportation resources. In general, hook-ups correspond to potential links between a first segment associated with a transportation resource and a second segment associated with the same transportation resource. Thus, the first segment ends at the same location that the second segment begins. In the context of an airline implementation, a "hook-up" is a link between a first market pair and a second market pair in which both market pairs are served by the same aircraft and where the first market pair includes an arrival station that is the departure station for the second market pair. For example, a potential hook-up might exist between a "Dallas-Austin" market pair with an arrival window between 8:00 a.m. and 10:00 a.m. and an "Austin-Houston" market pair with a departure window between 8:30 a.m. and 11:00 a.m. In general, a hook-up corresponds to a one-stop routing except that a one-stop routing may imply, for example, that passengers or cargo can continue through the stopover, while a hook-up can include situations where continuations are not allowed (e.g., passengers may not book a flight continuation). For purposes of this description, hook-ups include both situations where continuations are and are not allowed, while "one-stop routings" and "through-routings" are limited to situations where continuations are allowed. The set of possible hook-ups can include all possible hook-ups or can be limited according to a rule set, a random or arbitrary selection, or a manual operation.

The generation of a flight schedule also includes the process of selecting preferred departure times from the domain of all possible departure times. In the example above, the set of all possible departure times for the Dallas-Houston market pair for the first flight might include 7:30 a.m., 7:35 a.m., 7:40 a.m., ... 5:55 p.m., and for the second flight, 7:35 a.m., 7:40 a.m., 7:45 p.m., ... 6:00 p.m. Because it is highly unlikely that departures would be spaced only five minutes apart, however, the set of possible departure times may be further limited, such as by limiting the departure times for the first flight to being before 1:00 p.m. and the departure times for the second flight being after 11:00 a.m. The actual departure times for both flights must then be selected from the set of possible departure times for each flight. The selection is based on the extent to which each possible departure time meets efficiency requirements and constraints such as airport restrictions, gate availability, the demand for flights at the particular time of day, and a desire to distribute departing flights for each market pair to minimize overlapping demand between flights. Constraints other than those referenced above can be used as factors that serve as bases for determining which departure times are preferred in generating a schedule. The factors may also be interrelated such that changing parameters or departure times for one area of the transportation network can have an effect on other areas of the transportation network.

Because of the multitude of constraints involved in schedule design and the complex interactions of numerous factors, it is necessary to analyze and select preferred departure times based on the constraints and parameters. Constraint programming and mathematical programming are techniques that may be used to determine the feasibility and optimization of a flight schedule. In mathematical programming, variables are generally used to represent elements that are controlled independently. Here, variables include each particular set of possible departure and/or arrival times from each market in the transportation network, which permits efficient analysis of the spacing between departure times. Referring to the example above, a first variable can represent one set of possible departure times for the two flights in the Dallas-Houston market pair. For example, x may represent the scenario in which the first flight departs Dallas at 7:30 a.m. and the second flight departs at 12:00 p.m. A second variable y may represent the scenario in which the first flight departs at 7:35 a.m. and the second flight departs at 12:00 p.m. A third variable z may represent the scenario in which the first flight departs at 7:35 a.m. and the second flight departs at 12:05 p.m. Each successive variable would represent a particular scenario involving the two departing flights in the Dallas-Houston market pair. Conceptually, a separate variable can be assigned for every different possible combination of departure times from the set of all possible departure times. In practice, however, a set of variables is generated for each market in some implementations, and the set of variables does not include every possible variable. Instead, the set of variables comprises a sampling of possible variables selected based on scoring values generated for each variable. The scoring values generated for each variable represent a measure of efficiency or desirability of the departure times represented by each variable based, for example, on how well the set of departure times comply with restrictions and/or preferences on the earliest and latest flights for the particular market pair, spacing parameters (e.g., compression, gap, and restrictions on latest first flight or earliest last flight for a market pair), and estimated or empirical demand information. Because each variable represents a different set of possible departure times for a flight originating from the market, the spacing between the first and second flight may be analyzed to determine whether demand for the second flight overlaps with demand for the first flight. Thus, a flight schedule with an optimal distribution of flights in each market may be generated.

The constraints can place restrictions on which combinations of hook-ups can be used and restrictions on the departure and/or arrival times. Thus, each of the one or more solutions includes a particular combination of hook-ups and a departure and/or arrival time for each routing segment. In some cases, more than one potential schedule can be generated if, for example, more than one departure time for a particular routing segment provides an acceptable solution. Other variables can include which transportation resources are assigned to which hook-ups and which stations are used as starting and ending points for each overall routing sequence. Typically, an overall routing sequence includes multiple segments and corresponds to a period over which a schedule repeats (e.g., a day).

Although this description focuses on particular implementations of the invention in the context of aircraft, the invention can also be used for other types of transportation resources. For example, the techniques can be used to generate bus or train schedules. In addition, transportation resources are not necessarily limited to equipment used for transporting people but can also include, for example, equipment for transporting cargo or any set of objects or devices that travel between multiple locations in some coordinated manner. For example, the transportation resources can include a set of containers that are each routed through different sequences of locations.

Figure 1:
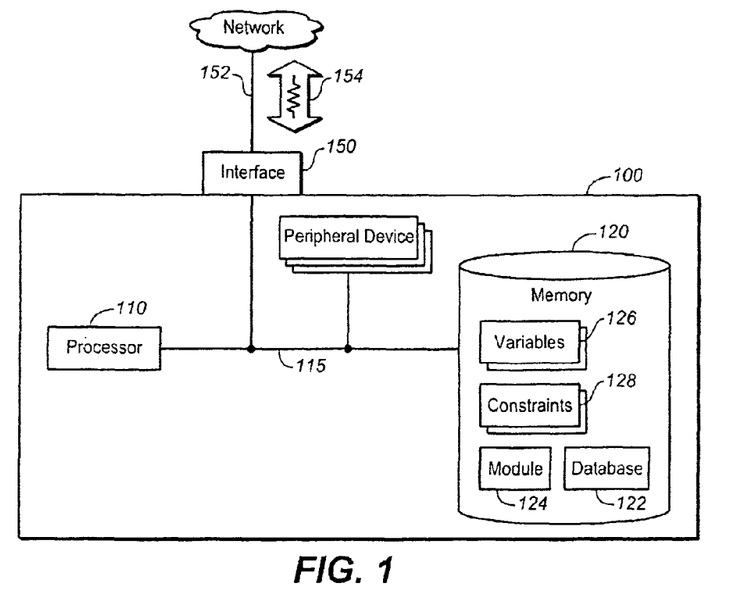
FIG. 1 is a block diagram illustrating a data processing system in which a mathematical programming module can be implemented.

FIG. 1 is a block diagram illustrating an example data processing system 100 in which a mathematical programming module can be implemented. The data processing system 100 includes a central processor 110, which executes programs, performs data manipulations, and controls tasks in the system 100. The central processor 110 is coupled with a bus 115 that can include multiple busses, which may be parallel and/or serial busses.

The data processing system 100 includes a memory 120, which can be volatile and/or non-volatile memory, and is coupled with the communications bus 115. The system 100 can also include one or more cache memories. The data processing system 100 can also include one or more peripheral devices 140, and one or more controllers and/or adapters for providing interface functions.

The memory 120 of the data processing system 100 is operable to store a database 122 and constraints 128 relating to parameters of a schedule of transportation resources. The memory 120 is also operable to store variables 126 representing possible departure times used in generating a proposed schedule of transportation resources. A mathematical programming module 124 is stored in or has access to the memory 120 and the database 122. The mathematical programming module 124 is operable to use an objective function to evaluate the constraints 128 and the variables 126 representing possible departure times to generate a proposed schedule for a transportation network.

The system 100 can further include a communication interface 150, which allows software and data to be transferred, in the form of signals 154 over a channel 152, between the system 100 and external devices, networks, or information sources. The signals 154 can embody instructions for causing the system 100 to perform operations. The system 100 represents a programmable machine, and can include various devices such as embedded controllers, Programmable Logic Devices (PLDs), Application Specific Integrated Circuits (ASICs), and the like. Machine instructions (also known as programs, software, software applications or code) can be stored in the machine 100 and/or delivered to the machine 100 over a communication interface. These instructions, when executed, enable the machine 100 to perform the features and functions described above. These instructions represent controllers of the machine 100 and can be implemented in a high-level procedural and/or object-oriented programming language, and/or in assembly/machine language. Such languages can be compiled and/or interpreted languages.

Figure 2:
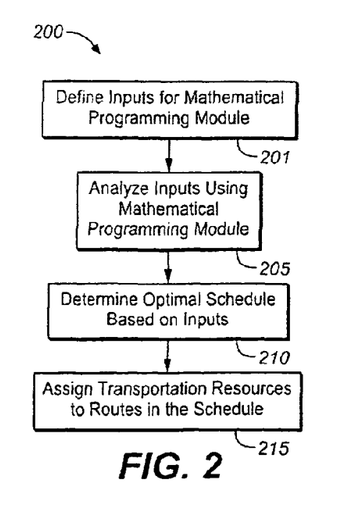
FIG. 2 is a flow diagram of a process for generating an optimized schedule in a network of transportation resources.

FIG. 2 is a flow diagram of a process 200 for generating an optimized schedule in a network of transportation resources. A mathematical programming module is used to determine an optimal schedule based on a set of inputs. The mathematical programming module is operable to use linear programming and dynamic programming to measure and rate possible schedules based on the inputs.

First, a set of inputs is defined at step 201. The inputs to the mathematical programming module include variables, constraints, scheduling parameters, and an objective function. Generally, the variables represent possible departure times of flights from a particular market. The mathematical programming module selects some variables out of the entire group of possible variables based on which variables best represent the schedule that fits the constraints and the goals of the objective function.

Constraints, in the context of linear programming, are logical relationships among multiple variables that restrict or express preferences for the possible values the variables can take and provide partial information about the variables. A problem to be solved using linear programming generally involves a set of variables, each of which is mapped to a finite domain of possible values, and a set of constraints. Each constraint provides some restriction on the combination of values that the set of variables can take simultaneously. Linear programming generates one or more solutions to the problem by assigning to each variable one or more values from the corresponding domain of possible values. The values are assigned such that the constraints are satisfied.

In linear programming, the objective function is a mathematical expression that combines the variables in a way that expresses the extent to which that combination of variables meets a particular goal or set of goals. Here, the objective function is designed to provide some measure of efficiency, such as efficiency of meeting demand, producing revenue at relatively low cost, reducing costs, or resource utilization.

Once the inputs are defined, they are fed into the mathematical programming module at 205. The problem of determining which variables are preferred over other variables for a flight schedule can be characterized as a linear programming problem. The mathematical programming module solves the linear programming problems by rating each variable based on the objective function and iteratively selecting variables based on each variable's rating and whether the variable substantially satisfies the predefined set of constraints. In some implementations, the mathematical programming module can solve one or more subproblems as part of solving a larger master problem when selecting the preferred variables. The variables that are rated the highest and that substantially meet the predefined constraints are the variables that represent the optimal schedule as determined by the mathematical programming module at step 210. Specific aircraft are then assigned to each route within the optimal schedule using fleet assignment techniques based on mathematical programming at step 215.

Figure 3:
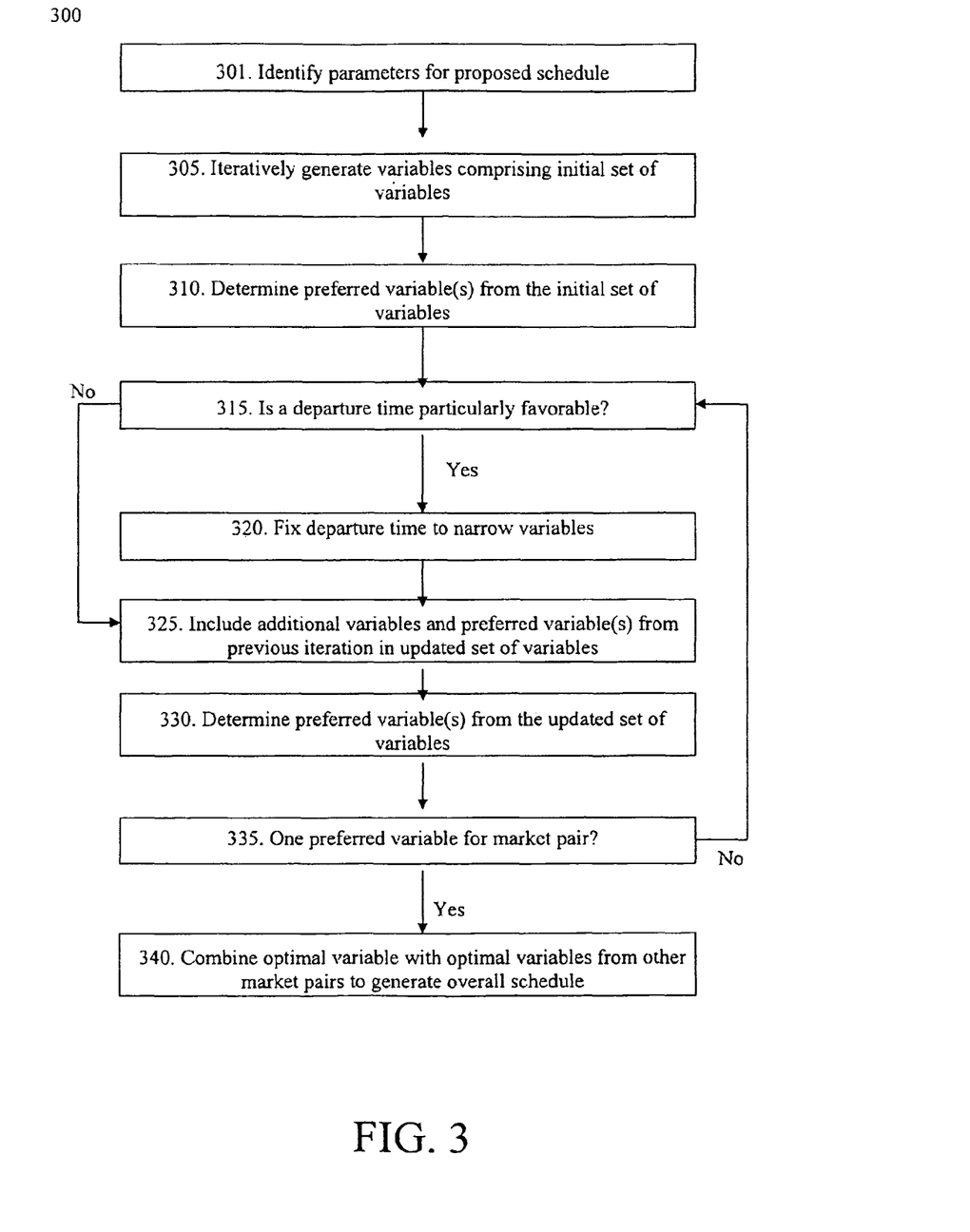
FIG. 3 is a flow diagram of a detailed mathematical programming process for generating a proposed schedule in an airline network.

FIG. 3 is a flow diagram 300 of a more detailed mathematical programming process for generating a proposed schedule in an airline network. Initially, parameters for the schedule are identified at step 301. The parameters can include the number of transportation resources (e.g., a number of aircraft), stations or endpoints (e.g., airports) for segments to be traveled by the transportation resources; basic demand parameters (e.g., a number of flights to be scheduled between each pair of airports); the markets to be served; the number of flights per day for each market pair; gate-to-gate travel time; departure ranges, which can be influenced by market size; empirical demand data, business versus leisure travel considerations; and minimum and maximum turnaround times, which can vary depending on flight distance, origination, destination, historical demand, and the like.

The parameters also include constraints, which set limits on the range of possible solutions. These constraints are inputted into the mathematical programming module. In general, the constraints define rules and preferences based on which a schedule is generated. The constraints relate to the transportation resources, routing and allocation thereof, and schedule design. For example, the constraints can define the number of transportation resources by type, station data (e.g., gates, curfews, market size), travel times between each station pair, and turnaround times for each station (i.e., allowed lengths of stopovers at each station). The constraints can also include minimum and maximum remain overnight thresholds, gate constraints (e.g., maximum number of gates available at a station), simultaneous departure and arrival constraints, market spacing parameters, and locked or preferred one-stops (i.e., flights arriving at a station that must or should hook-up with a particular flight or one of a set of flights departing from the station). The constraints may further be divided into operational constraints (e.g., station data defining a quantity of gates and a quantity of required or possible overnight planes; valid equipment types; maintenance, turnaround times, and the like) and marketing constraints (e.g., limiting or shaping flight departure times; spacing between departing flights for the same market pair; through patterns; and the like).

In some airline industry implementations, the input constraints include a listing of every market served by the airline, the frequency or number of flights for each market pair, and the gate-to-gate travel time for each market pair. Other constraints include turnaround times, possible hook-ups and one-stop routings, mandatory and preferred one-stop routings, station data (gates, simultaneous departure/arrival limitations, curfews, maximum planes to remain overnight, etc.), equipment type counts, business/leisure times, maintenance stations/times, market pattern/restriction requirements, and spacing settings. Some constraints (e.g., gate-to-gate travel time and spacings) can vary by time of day or week. Typically, although not necessarily, the input constraints are relatively fixed and cannot be varied during a particular generation of a proposed schedule. It is possible, such as when the techniques are being used to predict differences in efficiency or productivity between different resource allocations, to generate multiple proposed schedules and to vary the input constraints for the different proposed schedules.

A particular type of parameter, the marketing day, is also defined. For each market pair, a marketing day is segmented into a number of departure times (for the departure station) and corresponding arrival times (for the arrival station). In some implementations, an explicit arrival time need not be defined because it is essentially specified by the departure time plus some known approximate flight time. Alternatively, an explicit departure time need not be defined because it can be determined based on the arrival time minus some known approximate flight time. The marketing day is defined for each station. Marketing day settings generally include a start time and an end time, which may result from airport operating hours and/or a period during which there is demand for flights. The marketing day settings for a particular market define a preferred or mandatory window within which all flights serving that market should or must depart/arrive. The marketing day settings can include acceptable and preferred marketing days. An acceptable marketing day parameter can dictate a specific earliest time before which no flights can be scheduled and a specific latest time after which no flights can be scheduled for a particular market pair. For example, an acceptable marketing day parameter may indicate 7:00 a.m. as the earliest possible departure time for a particular market pair because a flight scheduled earlier than 7:00 a.m. would not generate sufficient passenger traffic to justify the costs of scheduling that flight. A preferred marketing day parameter typically defines a narrower window within which it is preferable, but not necessarily required, for all departure or arrival times for a particular market pair to be scheduled. Accordingly, the preferred marketing day is generally contained by the acceptable marketing day. The marketing day can be segmented into equally or approximately equally spaced departure times. Alternatively, parameters can be defined that allow some spacing between departure times to be smaller than others. For example, spacing between departure times during the morning and evening hours may be smaller for some markets to account for typical travel patterns of business travelers (e.g., in accordance with business/leisure constraints). Parameters can also be defined for shaping spacing between departure times in accordance with other rules. For example, for a market pair that has only two flights per day, there may be a rule specifying that one departure cannot be later than 9:00 a.m. and that the other departure cannot be earlier than 4:00 p.m. Each departure time corresponds to a flight for the market pair.

Spacing parameters can be based on a spacing matrix, which can be a mathematical representation of the ideal spacing between flights for each market based on historical data or business objectives for increasing revenue for each market. The spacing matrix can be applied to variables as a soft constraint where adjacent flights that violate the spacing parameters will incur a penalty in terms of their value to an optimized schedule. The spacing parameters for adjacent flights may differ for specified periods throughout a marketing day. Spacing parameters may also include anchor points in certain implementations. While the marketing day parameters define the outer boundaries of scheduled flights for a particular market pair, anchor points define the inner boundaries of scheduled flights. In other words, anchor points define the latest acceptable or preferred time at which the first departure time for a particular market can be scheduled and the earliest acceptable or preferred time at which the last departure time for the particular market can be scheduled. Given the frequency and demand data of a particular market, setting the anchor points for the market can have an effect on the spacing of flights departing from that market.

Figure 4:
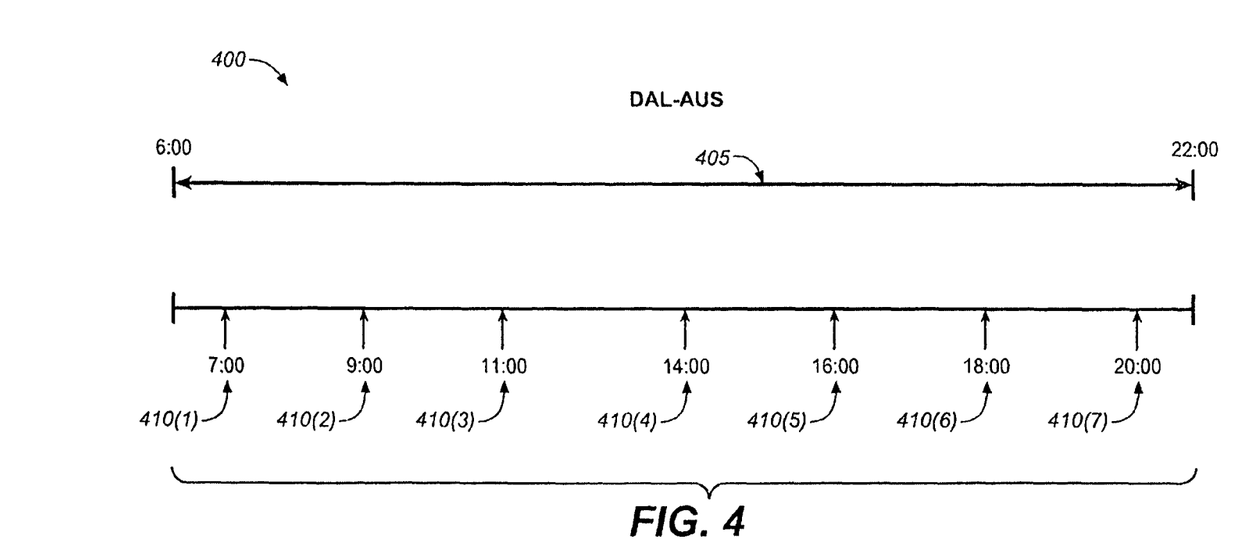
FIG. 4 is a diagram depicting an example marketing day that is segmented into a number of departure times.

FIG. 4 is a conceptual diagram 400 of an example marketing day 405 that is segmented into a number of departure times 410. The diagram 400 represents a marketing day 405 for flights from Dallas to Austin (DAL-AUS). In this example, there are to be seven flights per day from Dallas to Austin. Accordingly, the marketing day 405 is segmented into seven departure times 410 separated by an approximately equal length, although a greater spacing appears in the middle of the day. The example marketing day 405 begins at 6:00 a.m. and ends at 10:00 p.m. (i.e., 22:00). A first departure time 410(1) is at 7:00 a.m., a second departure time 410(2) is at 9:00 a.m., and so on.

Constraints that limit potential "hook-ups" may also be identified. In general, potential hook-ups do not include every theoretically possible hook-up but only those hook-ups that result in a stopover that is less than a predefined maximum threshold but greater than a predefined minimum threshold (e.g., where the possible departure times for the second market pair in a hook-up includes at least one potential departure time that is between twenty and forty minutes of at least one potential arrival time for the first market pair). A minimum turnaround time or stopover constraint and a maximum turnaround time or stopover constraint can be defined. Use of such constraints helps reduce the total number of potential hook-ups. Thus, potential hook-ups are determined based primarily on departure times and turnaround time constraints. Each particular market pair for a particular arrival time can have one or more potential hook-ups. For example, a "Dallas-Austin" market pair with an arrival time of 9:00 a.m. can have potential hook-ups with an "Austin-Houston", "Austin-El Paso", "Austin-Las Vegas", and/or "Austin-Harlingen" market pair having a subsequent departure time.

Figure 5:
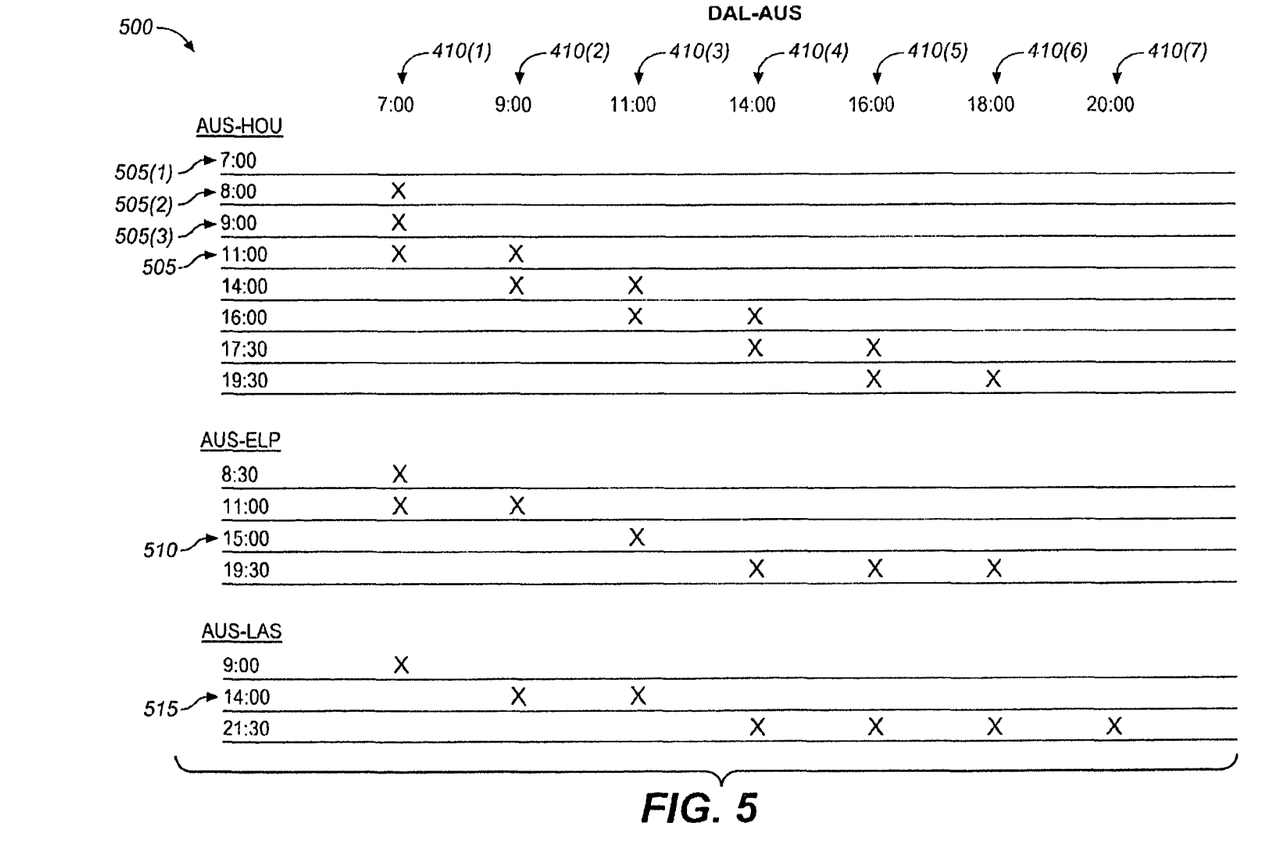
FIG. 5 is a chart of representative potential hook-ups corresponding to the departure times of FIG. 4.

FIG. 5 is a chart 500 of representative potential hook-ups corresponding to the example departure times 410 of FIG. 4. Each departure time 410 corresponds to a flight from Dallas to Austin that can hook-up with a flight from Austin to some other destination (possibly including returning to Dallas). In this example, there are flights from Austin to Houston (AUS-HOU), Austin to El Paso (AUS-ELP), and Austin to Las Vegas (AUS-LAS). Each market pair includes its own set of departure times. For example, the Austin to Houston flights include eight departure times 505, the Austin to El Paso flights include four departure times 510, and the Austin to Las Vegas flights include three departure times 515. The chart 500 indicates which of the Dallas to Austin departure times 410 can potentially hook-up with which of the departure times 505, 510, and 515 of flights departing from Austin (assuming a gate-to-gate travel time from Dallas to Austin of one hour and a turnaround time of twenty to forty minutes). For example, a Dallas to Austin flight departing at 7:00 a.m. can potentially hook-up with Austin to Houston flights corresponding to three different departure times 505(1), 505(2), and 505(3), and a Dallas to Austin flight departing at 9:00 a.m. can potentially hook-up with Austin to Houston flights departing at 11:00 a.m. and 2:00 p.m.

For some market pairs and departure times, one of the potential hook-ups is a termination. In other words, one of the options, or the only option, for a particular market pair at a particular time is that the aircraft that departs the origin market of the market pair does not actually hook-up with another flight. Instead, the aircraft spends an overnight at the station. A flight that arrives at the station for an overnight is a terminating flight. Each terminating flight generally corresponds to an originating flight the following morning and also identifies a flight associated with an aircraft that will "remain overnight." Accordingly, the number of "remain overnight" aircraft should not exceed the number of available aircraft.

Figure 6:
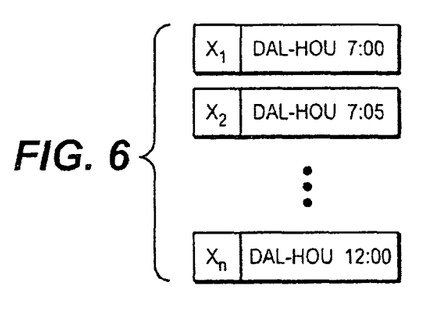
FIG. 6 is a diagram of an example data structure of a variable used in linear programming.
Figure 7:
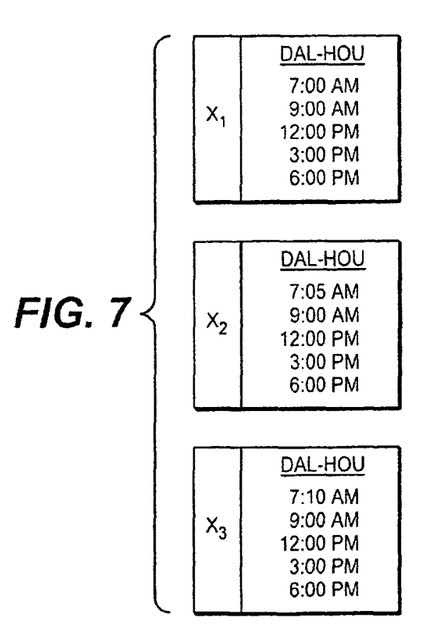
FIG. 7 is a diagram of an example data structure of a composite variable used in linear programming.

As shown in FIG. 3, an initial set of variables is iteratively generated for each market pair at step 305. Variables are used to represent possible scenarios of departing flights from a particular market. The scenarios represented by variables include departure times at each market. In some implementations, each variable can represent one possible departure time from a market. In this case, only one flight can be represented by the variable because the variable is comprised of only one departure time. For example, as depicted in FIG. 6, a first variable $x_1$ may represent one possible departure time of 7:00 a.m. from the Dallas market. A second variable $x_2$ may represent a second possible departure time of 7:05 a.m. Successive variables may define successive possible departure times as represented by $x_n$. One deficiency of this approach for assigning variables is that it becomes difficult to determine the relationship between flights out of one market for a particular market pair. Another method for assigning variables that solves this problem is to define composite variables for each market pair. Each composite variable represents one composite potential scenario of all possible departure times out of the particular market for one market pair. Thus, in FIG. 7, for example, each composite variable represents one set of all possible departure times for a market. There are five flights from Dallas to Houston during the day, and the variable $x_1$ represents the scenario where the departure times for the five flights are 7:00 a.m., 9:00 a.m., 12:00 p.m., 3:00 p.m., and 6:00 p.m. Variable $x_2$ represents a different set of departure times: 7:05 a.m., 9:00 a.m., 12:00 p.m., 3:00 p.m., and 6:00 p.m. Variables are further defined in this manner to generate a set of variables for each market pair. Defining variables in this manner allows each scenario to be analyzed for efficient spacing between flights by examining each potential flight departing from a particular market in a market pair simultaneously. Defining each variable as one possible set of all departure times from a market allows easier measurement of the spacing requirements of the schedule.

Variables can be defined based on the degree to which the set of departure times represented by each variable furthers a predefined goal expressed by an objective function. In other words, variables are generated to include departure times that are preferred over other departure times consistent with predefined efficiency measurements, often represented in an objective function. In some implementations, a value is assigned to particular departure times representing the desirability of including the particular departure times in each variable for each market pair. The assigned values can be based on spacing data or historical demand for certain departure times associated with the market. Specifically, the departure times are assigned values, or scored, based on consistency with an objective function.

In general, the objective function is designed to provide some measure of efficiency, such as efficiency of meeting demand, producing revenue at relatively low cost, reducing costs, or resource utilization. In linear programming, the objective function is a mathematical expression that combines the variables and represents some efficiency goal such as revenue. The objective function is maximized or minimized based on the type of efficiency measurement desired. Thus, if maximizing revenue is the goal, an objective function is defined to express the amount of revenue generated in terms of the variables previously defined—that is, in terms of possible departure times. The objective function is then maximized by determining the set of departure times that will yield the greatest revenue. In some implementations, the objective function relates to maximizing passenger traffic minus operational violations and spacing penalties such as gap and compression. Thus, variables with departure times that have greater passenger demand and that are spaced apart more consistently with predefined spacing models generally are preferred over variables lacking these features.

Defining the objective function may include the application of a demand function and/or spacing matrix to incorporate demand for particular flight times and preferred or optimal spacing between flights into the generated schedule. The demand function can be an actual curve or other data, based on historical data and/or market research, that models demand based on, for example, a particular market, market size, departure times, how close and how far flights for the same market pair are spaced apart, nonstop traffic, one-stop traffic, multi-stop traffic, and any other quality or characteristic that may affect demand. The spacing matrix can be a function incorporating business objectives and/or market research that expresses the ideal amount of time between flights depending on the particular market and time of day. The demand function and spacing matrix can both be used to define the objective function and assign values to the variables or to each departure time within a variable.

Returning to FIG. 3, the values for each departure time can be calculated using a dynamic program, and a solution to the dynamic program can include a variable comprising a number of departure times that are relatively desirable compared to other departure times. For example, based on a preferred or acceptable marketing day parameter, departure times for a particular market pair may begin at 9:00 a.m. Accordingly, an initial departure time may be set at 9:00 a.m., and the remaining departure times in the day are selected for a variable based on the values assigned to the departure times given a first departure time for the market at 9:00 a.m. Different departure times may be used as the first departure time for the market, and a different set of departure times for the entire marketing day can be iteratively generated for each initial starting departure time. A group of variables is accordingly generated at step 305, comprising an initial set of variables for a market pair. In general, the set of variables for the market pair does not include every possible scenario of departure times for that market pair. Rather, certain variables are selected as a sampling of all possible variables using column-generation techniques. Further, not all the departure times with the highest assigned values may be represented in the set of variables.

After initially defining one or more variables in a set of variables for each market pair, the variables are analyzed to compare the desirability of each variable with respect to other variables for the same market pair. In some implementations, one or more nominally or relatively preferred variables among a set of variables can be determined by characterizing the analysis as a linear programming problem, which can be solved to determine a solution at step 310. An objective function can be used rate the variables relative to each other, and the solution comprises one or more variables from the set of variables that are preferred over other variables based on each variable's rating. In the solution, the variables can be assigned weighted values indicating the relative desirability of the set of departure times represented in each variable compared with other variables for a particular market pair.

After determining the weighted values for one or more variables in the initial set of variables, a second iteration of analyzing variables for a particular market pair can be performed. During the second iteration of determining an optimal variable for a particular market pair, a second combination or set of variables can be analyzed. The second set of variables can include variables considered in a previous iteration of solving linear problems for the particular market pair such as the weighted variables identified in the solution generated during the first iteration. Further, additional variables or combinations of variables that have not been previously analyzed can be included in the second set of variables. The identification of additional variables to be considered in the linear problem can be based on the assigned values to each potential departure time or other constraints or measurements of efficiency at step 325. The additional variables can be dynamically and iteratively generated using dynamic programming similar to operations performed at step 305. In some implementations, secondary optimization problems can be solved to generate additional variables. Similarly, certain variables in the initial set of variables can be removed from consideration during the second iteration if the variable does not compare favorably with other variables considered during the analysis.

The inclusion of additional variables or removal of unfavorable variables from analysis in the mathematical programming module can also be based on whether any departure times have been fixed. After at least one iteration, the variables may be narrowed to isolate an optimal variable for a particular market pair at steps 315 and 320. In some implementations, the narrowing of variables occurs only after many iterations. The narrowing of variables begins with fixing a particular departure time, or decision. The fixed departure time may have a particularly high value assigned to it relative to other departure times for the market. Alternatively, the fixed departure time may be a recurring departure time that repeatedly appears in multiple solutions of variables for a market pair. In other words, a departure time is fixed if it is a particularly favorable departure time as determined by the mathematical programming module at steps 315 and 320. Accordingly, the departure time may constitute a relatively desirable departure time for the market, and only variables including the fixed departure time may be considered in future iterations or included in a solution of preferred variables. In some implementations, departure times in the highest frequency markets are fixed first because higher frequency markets have less latitude for spacing possible departure times. Once a particular departure time is fixed, further iterations determine when another departure time should be fixed, thereby reducing the range of possible solution variables and further narrowing the field of variables to be analyzed for schedule optimization. Alternatively, in some implementations, a particular variable can be fixed, and future iterations and solutions would necessarily include the fixed variable.

After the second set of variables is defined, linear programming can be used to determine a solution comprising one or more preferred variables from the second set at step 330. The preferred variables from the second set may include preferred variables identified during the first iteration. In any event, multiple iterations of identifying preferred variables among sets of variables for a particular market pair can be performed until one optimal variable is determined for each market pair. That is, the process continues with each iteration until each market pair has one optimal variable representing a proposed schedule for that market pair at steps 335 and 340. In some instances, the one optimal variable for a market pair can be obtained by combining a plurality of preferred variables for the market pair based on a weighting function. The optimal variables for each market pair are combined to form a base schedule for non-stop services in a transportation network.

The set of departure times that generates the greatest revenue according to the objective function should also conform to the predefined constraints. In some instances, a set of departure times that generates the greatest amount of revenue according to the objective function may also violate various constraints. For example, an ideal departure time for a flight leaving a particular market may be at 6:00 p.m. as dictated by the objective function, but the 6:00 p.m. flight may not have a corresponding hook-up flight available any later than 1:00 p.m. That is, due to the scheduling of flights for this market, the only way to have a flight departing at 6:00 p.m. would be to use the aircraft that lands at 1:00 p.m., which means the 1:00 p.m. aircraft would remain idle at the station for five hours before departing at 6:00 p.m. A five hour layover for the aircraft may violate a typical maximum layover constraint, which may be set at, for example, one hour, and the schedule in this example would not be feasible given the one hour layover constraint. Accordingly, as the example illustrates, linear programming techniques should take account of the objective function as well as any predefined constraints.

Constraints may be defined as logical relationships among multiple variables that restrict the possible values the variables can take and provide partial information about the variables. Specifically, constraints can be represented as mathematical expressions that combine the variables to express limits on possible solutions. In certain implementations, some constraints are implemented as soft constraints. That is, the constraints include a violation variable, and a variable or departure time in violation of a constraint is not necessarily prohibited but incurs a penalty in terms of its assigned value associated with the objective function. The constraints, variables, and objective function are included as inputs in the mathematical programming module. The objective function is used to develop a score for each variable based on the extent to which the departure times represented within each variable will result in a schedule with a greater measure of efficiency as defined by the objective function.

Mathematical programming techniques are also used to ensure that the predefined constraints are respected when generating a schedule. Combinations of variables that have a relatively high score based on the objective function but that do not satisfy certain constraints may be excluded from the overall solution. Thus, variables are selected based on both optimization in accordance with the objective function and feasibility in accordance with predefined constraints. For example, given certain layover constraints, departure times for inbound and outbound flights in a market should be arranged such that efficient or optimal hook-ups are generated and the layover constraints are met. Returning to the example above, if a particular market has a relatively high demand for a 6:00 p.m. departure time, the departure times for inbound flights into the same market should be selected such that there is a hook-up flight arriving at the market not more than one hour before 6:00 p.m. in order to satisfy the maximum one hour layover constraint. Alternatively, the 6:00 p.m. departure time could be shifted earlier or later to hook-up with inbound flights while still accommodating the layover constraints.

In any event, mathematical programming techniques are used to score the various alternatives and select preferred variables and hook-ups to generate an optimal schedule that not only yields a high level of efficiency but also satisfies predefined constraints. The mathematical programming process can be implemented using Mathematical Programming Solver Libraries. The mathematical programming process will score each variable based on the objective function. The variables with higher scores generated by the mathematical programming analysis are generally preferred over variables with lower scores. The mathematical programming process, however, may exclude certain variables from consideration in generating a proposed schedule regardless of the variable's score due to the application of the predefined constraints. That is, the mathematical programming process should select variables such that the final proposed schedule is not only efficient, but also feasible and substantially satisfies the predefined constraints.

In certain implementations, once a proposed schedule has been built after iteratively analyzing sets of variables for each market pair, flight hook-ups are determined, designating which flights hook-up with each other between various market pairs. For each flight departing from a market, there must be a corresponding flight arriving at the same market. Each flight departing from and arriving at a market represents an instance of a flight segment to be served by a particular transportation resource. The instances of flight segments that are linked together through designation as hook-ups form a sequence of flight segments to be served by the same transportation resource. The sequential association of flight segment instances are routes within the transportation network. Maximum and minimum layover constraints may limit which arriving flights may hook-up with which departing flights. Other constraints may also limit which hook-ups are designated for each flight, such as gate restrictions or the maximum number of flights that may depart or arrive within a given time frame.

Among the variables that substantially satisfy the predefined constraints and that have departure and/or arrival times with acceptable hook-ups, the variables with a relatively high score are combined as part of an overall proposed schedule. The overall schedule generally should include a relatively greater presence of features considered to be beneficial by the objective function and/or a fewer number of features considered to be unfavorable by the objective function. The overall proposed schedule includes flight departure or arrival times for each market pair within the transportation network, and, in certain implementations, information regarding the routes formed by the designated flight hook-ups. Once the overall proposed schedule is generated, individual transportation resources may be assigned to the various routes within the proposed schedule using fleet assignment techniques based on mathematical programming.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. For example, the sequence of steps in the processes described in reference to FIGS. 2 and 3 can be performed in a different order and/or some steps can be performed in parallel. Further, the present disclosure describes the generation of a proposed schedule for a single marketing day. In other implementations within the scope of the present disclosure, the techniques disclosed herein can be expanded to generate a proposed schedule for multiple marketing days. In addition, the described techniques can be used for scheduling any type of transportation resources and constraints can be tailored to the type of scheduling problem and/or according to preferences of a user or entity implementing the techniques.

What is claimed is:

1. A computer-implemented method for generating a schedule for a network of transportation resources, the method comprising:

selecting a plurality of market pairs in a transportation network;

identifying a quantity of flights to be flown over at least a marketing day for each market pair, wherein the quantity of flights includes more than one flight;

determining a range of permissible departure times or arrival times for each market pair in the selected plurality of market pairs;

iteratively generating, by operation of at least one computer, sets of variables for each market pair using an objective function and based on at least the determined range of permissible departure times or arrival times for the market pair and spacing parameters, wherein each generated variable represents a different set of possible departure times or arrival times for adjacent flights associated with a particular market pair, each different set including a possible departure time or arrival time for each flight in the identified quantity of flights for the particular market pair, and each different set is generated in accordance with the spacing parameters that define spacing between adjacent departing flights or adjacent arriving flights associated with the particular market pair; and     building, by operation of at least one computer, a proposed schedule based on the generated sets of variables for each market pair and a set of constraints by selecting a variable of the generated sets of variables, wherein the selected variable represents a selected set of departure times and arrival times for a plurality of flights associated with the market pair, and the set of constraints includes at least one constraint selected from a group consisting of a number of transportation resources, services to be provided by transportation resources, a number of segments to be served by transportation resources between each of a plurality of locations, and constraints on sequential associations of segments.

2. The computer-implemented method of claim 1, wherein the objective function is based on measures of efficiency relating to at least one of demand, revenue, costs, or resource utilization.

3. The computer-implemented method of claim 1, wherein iteratively generating the sets of variables for each market pair comprises assigning a value based on the objective function for each departure time or arrival time for a market pair and generating a particular variable based on the assigned values of the departure times or the arrival times.

4. The computer-implemented method of claim 1, wherein an initial set of variables for each market is generated based on a sampling of potential variables, the sampling of potential variables determined using column generation.

5. The computer-implemented method of claim 3, wherein an initial set of variables and a second set of variables for a market pair are generated, the second set of variables comprising at least one additional variable excluded from the initial set of variables.

6. The computer-implemented method of claim 1, wherein the range of permissible departure or arrival times includes an earliest and latest limit for departing or arriving flights for a particular marketing day.

7. The computer-implemented method of claim 1, wherein building the proposed schedule comprises narrowing the sets of variables for a market pair by establishing at least one set departure time or arrival time for each variable of the market pair, wherein the at least one set departure time or arrival time is the same for each variable of the market pair.

8. The computer-implemented method of claim 1 wherein the proposed schedule comprises a plurality of routes, each route including a sequential association of a plurality of segments to be served by transportation resources, and generating the proposed schedule includes selecting sequential associations from a set of potential sequential associations to generate routes that substantially satisfy the set of constraints.

9. A system for generating a proposed schedule for a network of transportation resources, the system comprising:
at least one computer configured to:
access a plurality of constraints in a database, each constraint relating to a parameter of a schedule for a network of transportation resources;
generate a proposed schedule using a mathematical programming module to:
iteratively generate sets of variables for each market pair of a plurality of market pairs associated with a transportation network using an objective function to evaluate a plurality of potential variables, wherein each generated variable represents a different set of possible departure times or arrival times for adjacent flights associated with a particular market pair, each different set including a possible departure time or arrival time for each flight in a selected quantity of flights including more than one flight to be flown over at least a marketing day for the particular market pair, each different set generated in accordance with spacing parameters that define spacing between adjacent departing flights or adjacent arriving flights associated with the particular market pair, and wherein evaluating the plurality of potential variables comprises selecting variables based on at least a determined range of permissible departure times or arrival times for the market pair and the spacing parameters; and
build the proposed schedule based on the generated sets of variables for each market pair and the accessed plurality of constraints by selecting a variable of the generated sets of variables, wherein the selected variable represents a selected set of departure times and arrival times for a plurality of flights associated with the market pair, and the plurality of constraints includes at least one constraint selected from a group consisting of a number of transportation resources, services to be provided by transportation resources, a number of segments to be served by transportation resources between each of a plurality of locations, and constraints on sequential associations of segments.

10. The system of claim 9, wherein the objective function is based on measures of efficiency relating to at least one of demand, revenue, costs, or resource utilization.

11. The system of claim 9, wherein the proposed schedule includes a plurality of segments to be served by the transportation resources and at least one instance of each segment, wherein each instance of each segment corresponds to a departure time or an arrival time for the segment.

12. The system of claim 9, wherein variables in the sets of variables for each market pair are generated by solving secondary optimization problems comprising a subset of departure times or arrival times for each variable.

13. The system of claim 9, wherein iteratively generating the sets of variables for each market pair comprises assigning a value based on the objective function for each departure time or arrival time for a market pair and generating a particular variable based on the assigned values of the departure times or the arrival times.

14. The system of claim 13, wherein an initial set of variables and a second set of variables for a market pair are generated, the second set of variables comprising at least one additional variable excluded from the initial set of variables.

15. The system of claim 9, wherein the range of permissible departure times or arrival times includes an earliest and latest limit for departing flights or arriving flights for a particular marketing day.

16. The system of claim 9, wherein building the proposed schedule comprises narrowing the sets of variables for a market pair by establishing at least one set departure time or arrival time for each variable of the market pair, wherein the at least one set departure time or arrival time is the same for each variable of the market pair.

17. The system of claim 9, wherein evaluating the plurality of potential variables includes mathematical or linear programming.

18. A software module stored in a tangible, non-transitory, computer-readable storage device, the module comprising instructions causing a processor to:
select a plurality of market pairs in a transportation network;
identify a quantity of flights to be flown over at least a marketing day for each market pair, wherein the quantity of flights includes more than one flight;
determine a range of permissible departure times or arrival times for each market pair in the selected plurality of market pairs;
iteratively generate sets of variables for each market pair using an objective function and based on at least the determined range of permissible departure times or arrival times for the market pair and spacing parameters, wherein each generated variable represents a different set of possible departure times or arrival times for adjacent flights associated with a particular market pair, each different set including a possible departure time or arrival time for each flight in the identified quantity of flights for the particular market pair, and each different set is generated in accordance with the spacing parameters that define spacing between adjacent departing flights or adjacent arriving flights associated with the particular market pair; and build a proposed schedule based on the generated sets of variables for each market pair and a set of constraints by selecting a variable of the generated sets of variables, wherein the selected variable represents a selected set of departure times and arrival times for a plurality of flights associated with the market pair, and the set of constraints includes at least one constraint selected from a group consisting of a number of transportation resources, services to be provided by transportation resources, a number of segments to be served by transportation resources between each of a plurality of locations, and constraints on sequential associations of segments.

19. The module of claim 18, wherein iteratively generating the sets of variables for each market pair comprises assigning a value based on the objective function for each departure time or arrival time for a market pair and generating a particular variable based on the assigned values of the departure times or the arrival times.

20. The module of claim 18, wherein an initial set of variables and a second set of variables for a market pair are generated, the second set of variables comprising at least one additional variable excluded from the initial set of variables.

21. The module of claim 18, wherein the range of permissible departure times or arrival times includes an earliest and latest limit for departing flights or arriving flights for a particular marketing day.

22. The module of claim 18, wherein building the proposed schedule comprises narrowing the sets of variables for a market pair by establishing at least one set departure time or arrival time for each variable of the market pair, wherein the at least one set departure time or arrival time is the same for each variable of the market pair.

* * * * *